(12) United States Patent
Vincent et al.

(10) Patent No.: US 6,879,424 B2
(45) Date of Patent: Apr. 12, 2005

(54) ELECTROCHROMIC DISPLAY DEVICE AND COMPOSITIONS USEFUL IN MAKING SUCH DEVICES

(75) Inventors: John B. Vincent, Midland, MI (US); Susan J. Babinec, Midland, MI (US); Daniel L. Dermody, Midland, MI (US); Yu Chen, Midland, MI (US)

(73) Assignee: Aveso, Inc., Frankenmuth, MI (US)

( * ) Notice: Subject to any disclaimer, the term of this patent is extended or adjusted under 35 U.S.C. 154(b) by 297 days.

(21) Appl. No.: 10/102,236

(22) Filed: Mar. 19, 2002

(65) Prior Publication Data

US 2002/0171081 A1 Nov. 21, 2002

Related U.S. Application Data

(60) Provisional application No. 60/277,030, filed on Mar. 19, 2001.

(51) Int. Cl.$^7$ .............................. G02F 1/15; G02B 5/23
(52) U.S. Cl. ....................... 359/265; 359/270; 359/272; 359/274; 252/586
(58) Field of Search ............................... 359/265–275; 252/583, 586

(56) References Cited

U.S. PATENT DOCUMENTS

| | | | |
|---|---|---|---|
| 3,280,701 A | 10/1966 | Donnelly et al. | ............... 88/77 |
| 3,806,229 A | 4/1974 | Schoot et al. | ............... 350/160 |
| 3,827,784 A | 8/1974 | Giglia et al. | ................. 350/160 |
| 3,951,521 A | 4/1976 | Findl | ........................ 350/160 |

(Continued)

FOREIGN PATENT DOCUMENTS

| | | |
|---|---|---|
| DE | 4443470 A1 | 6/1996 |
| EP | 796510 | 4/1999 |
| EP | 1043621 A1 | 10/2000 |
| JP | 53048538 | 5/1978 |
| JP | 1134429 | 5/1989 |
| JP | 01140132 | 6/1989 |
| JP | 06175165 | 6/1994 |

OTHER PUBLICATIONS

"Electrochromic Display Device and Compositions Useful in Making Such Device" filed in the United States of America on Mar. 19, 2001; Application Ser. No.: 60/277,030.

"Thermal and Optical Behavior of Electrochromic Windows Fabricated with Carbon–based Counterelectrode"; Electrochemical ACTA., 44 (1999) 3211–3217; Nishikitani, y., et al.

"Matrix Addressable Electrochromic Display Device" filed in the United States of America on Mar. 19, 2002; Application Ser. No.: 10/102,491, now U.S. Pat. 6,639,709, issued on Oct. 28, 2003.

"Electrochromic Display Device" filed in the United States of America on Mar. 19, 2002; Application Ser. No. 10/102,535, (now allowed).

Coleman, et al., "Printed, flexible electrochromic displays using interdigitated electrodes", Solar Energy Materials & Solar Cells 56 (1999) 395–418.

M. Brandon and B.P. Piggin, "Front Face Electrochromic Display", IBM Technical Disclosure Bulletin, vol. 21, No. 5, Oct. 1978, 2047.

*Primary Examiner*—Evelyn Lester
(74) *Attorney, Agent, or Firm*—Katten Muchin Zavis Rosenman; John S. Paniaguas

(57) ABSTRACT

The present invention relates to a composition and to a display device having the composition positioned between electrodes. The composition contains: (a) a compound that undergoes a reversible redox reaction to generate a pH gradient between the two electrodes, (b) an indicator dye, (c) a charge transport material, and optionally, (d) a matrix material and (e) an opacifier, and (f) secondary redox couple wherein components (a), (b), and (c) are different from one another and the standard reduction potential of component (a) is less than the standard reduction potential for the other components. Depending on the electric field present between the electrodes, a display image may be generated.

44 Claims, 1 Drawing Sheet

U.S. PATENT DOCUMENTS

| | | | |
|---|---|---|---|
| 4,129,861 A | 12/1978 | Giglia | 340/324 |
| 4,175,838 A | 11/1979 | Randin | 350/357 |
| 4,408,202 A | 10/1983 | Fales | 340/785 |
| 4,488,781 A | 12/1984 | Giglia | 350/357 |
| 4,550,982 A | 11/1985 | Hirai | 350/357 |
| 4,712,879 A | 12/1987 | Lynam et al. | 350/357 |
| 4,810,067 A | 3/1989 | Demiryont | 359/265 |
| 5,141,622 A | 8/1992 | Fauteux et al. | 205/55 |
| 5,189,549 A | 2/1993 | Leventis et al. | 359/271 |
| 5,225,582 A | 7/1993 | Mason | 556/423 |
| 5,413,739 A | 5/1995 | Coleman | 252/511 |
| 5,444,330 A | 8/1995 | Leventis et al. | 313/506 |
| 5,457,564 A | 10/1995 | Leventis et al. | 359/271 |
| 5,545,291 A | 8/1996 | Smith et al. | 156/655.1 |
| 5,561,206 A | 10/1996 | Yamamoto et al. | 526/256 |
| 5,581,394 A | 12/1996 | Green et al. | 359/270 |
| 5,673,028 A | 9/1997 | Levy | 340/635 |
| 5,679,283 A | 10/1997 | Tonar et al. | 252/583 |
| 5,708,123 A | 1/1998 | Johannsen et al. | 528/229 |
| 5,818,636 A | 10/1998 | Leventis et al. | 359/273 |
| 5,852,509 A | 12/1998 | Coleman | 359/271 |
| 6,136,468 A | 10/2000 | Mitchell, Jr. et al. | 429/110 |
| 6,183,878 B1 | 2/2001 | Berneth et al. | 428/583 |
| 6,232,019 B1 | 5/2001 | Wunder et al. | 429/300 |
| 6,241,916 B1 | 6/2001 | Claussen et al. | 252/583 |
| 6,248,263 B1 | 6/2001 | Tonar et al. | 252/583 |
| 6,266,177 B1 | 7/2001 | Allemand et al. | 359/265 |
| 6,277,307 B1 | 8/2001 | Berneth et al. | 252/583 |
| 6,288,825 B1 | 9/2001 | Byker et al. | 359/265 |
| 6,294,111 B1 | 9/2001 | Shacklett, III et al. | 252/518.1 |
| 6,302,986 B1 | 10/2001 | Toya et al. | 156/109 |
| 6,327,069 B1 | 12/2001 | Allemand et al. | 359/365 |
| 6,372,154 B1 | 4/2002 | Li | 252/301.16 |
| 6,587,250 B2 | 7/2003 | Arngarth et al. | 359/265 |
| 6,639,709 B2 * | 10/2003 | Vincent et al. | 359/265 |
| 6,744,549 B2 * | 6/2004 | Vincent et al. | 359/269 |

* cited by examiner

ELECTROCHROMIC DISPLAY DEVICE AND COMPOSITIONS USEFUL IN MAKING SUCH DEVICES

This application claims the benefit of U.S. Provisional Application No. 60/277,030, filed Mar. 19, 2001.

FIELD OF THE INVENTION

This invention relates to electrochromic display devices and the compositions and materials used in such devices.

BACKGROUND OF THE INVENTION

Electrochromism is a term that is used to describe the fact that certain materials change color when exposed to an electric potential. Most electrochromic materials are based on oxidation/reduction (redox) chemistry. Generally, a material is used which is one color in its oxidized form and another color in its reduced form. Based on this principle, windows and mirrors utilizing these materials can be reversibly colored or bleached, as described in U.S. Pat. No. 4,712,879. Most electrochromic displays use a redox dye, which can either be inorganic or organic. For example, a display device using inorganic oxides, such as tungsten and molybdenum oxide, as the electrochromic material is disclosed in U.S. Pat. No. 3,827,784. A display device using an organic dye (viologen) is disclosed in U.S. Pat. No. 3,806,229. These systems may suffer from a lack of flexibility in design options in that, in order to change from one color system to another, the entire chemistry of the device would need to be changed, i.e., an entirely new redox dye would need to be used. A change in the redox dye can have significant impact not only on the optical properties (color, contrast, etc.) but also on other performance characteristics, such as power requirements, response time, open circuit lifetime, etc.

U.S. Pat. No. 3,280,701 describes one possible method of making a mirror in which the optical characteristics can be varied by the use of phenylthalein or other indicator dyes to create a color change between two electrodes in a slightly acidic aqueous solution.

JP Patent 01134429 suggests a similar method for increasing response time and preventing deterioration in a film of an electrochromic material. The display device used two cells containing liquid electrolyte solution with a pH adjusted to 6.0. The cells are located in a series between two electrodes and are separated by an ion exchange resin. One of the cells contains multiple acid-base indicators having different pH regions for decoloration. Applying positive and negative voltage alternately between the electrodes enables control of pH via control of current values. Control of pH in turn controls the coloration and limits the deterioration of the electrochromic material.

Systems using indicator dyes in slightly acidic aqueous solutions, while providing more options with regard to color and optical properties than the systems using redox dyes, also have their deficiencies. Specifically, as JP 0113429 notes because these embodiments are based on redox chemistry using the decomposition of water, a voltage at least equal to the theoretical decomposition potential must be applied. Thus, the systems have relatively high power (voltage) requirements. In addition, the decomposition of water will lead to formation of oxygen and hydrogen gases at the anode and cathode, respectively. Such gas bubbles will interfere with optical properties and potentially block the electrodes from further reaction.

Possibly, the most significant complicating factor is the fact that pH systems based on the hydrolysis of water will have limited lifetimes. A change in pH over time may limit the lifetime of display devices as many electrode surfaces, including indium tin oxide, are sensitive to acidic and/or basic environments. Additionally, as two cells in a series are taught by one of the embodiments in JP0113429, manufacture is necessarily complex. Finally, the migration of ions across the barrier may also slow the response time for this system.

Despite the long recognition that color can be controlled electrochromically and despite the use for some time of electrochromism to provide privacy windows and the like, a need remains for an efficient, high-contrast electrochromic display that have a reasonably long lifetime.

SUMMARY OF THE INVENTION

Applicants have developed a class of new electrochromic devices to display images. The devices of this invention possess one or more of the following benefits: ease of manufacture, relatively low power (voltage) requirements, ease of attaining multi-color and different color systems without significant redesign, relatively fast response times, and relatively long lifetime. In addition, according to one preferred embodiment, use of a matrix material and or opacifiers can improve and/or enhance control of various system parameters (e.g., open circuit lifetime,—i.e., time that image remains at levels of at least 50 percent of full contrast levels after power (voltage) is removed; resolution; optical density; and response time).

In a first embodiment, the invention is a display device comprising at least two electrodes one being anodic and one being cathodic, and positioned between those two electrodes in such a manner to be visible a composition comprising (a) a non-aqueous compound that undergoes a reversible electron transfer reaction with a subsequent change in its protic state resulting in a pH gradient in the device, (b) at least one indicator dye, and (c) a charge transport material.

According to a second embodiment, this invention is a display device comprising at least two electrodes and positioned between those two electrodes a composition comprising (a) a compound that undergoes a reversible electron transfer reaction with a subsequent change in its protic state, resulting in a pH gradient between the two electrodes, (b) at least one indicator dye, and (c) a charge transport material, wherein components (a), (b), and (c) are different from one another and component (a) preferentially undergoes the electron transfer reaction.

In a third embodiment, the invention is a display device comprising at least two electrodes and positioned between those two electrodes in such a manner to be visible a composition comprising (a) a compound that undergoes a reversible redox reaction to generate a pH gradient between the two electrodes, (b) at least one indicator dye, and (c) a charge transport material wherein components (a), (b), and (c) are different from one another and the standard reduction potential of component (a) is less than the standard reduction potential for the other components.

For each of these three embodiments, the composition preferably comprises (d) a matrix material. An opacifier component (e) may optionally be added as desired. Preferably, a secondary redox couple component (f) is also used.

In a fourth embodiment, the invention is a composition comprising (a) a compound that undergoes an electron transfer reaction with a subsequent change in its protic state, (b) at least one indicator dye which changes color when a change in pH occurs, and (c) an ionically conductive material. The composition optionally further comprises component (d) a matrix material. Components (a), (b), (c), and (d) are different from one another. Component (a) preferentially undergoes an electron transfer reaction when a charge is applied to the composition. Additionally, if component (c) is a fluid, the composition further comprises the matrix material component (d). An opacifier (e) and/or a secondary redox couple (f) are added in more preferred embodiments.

In a fifth embodiment, the invention is a composition comprising component (a), a compound that undergoes a reversible redox reaction to generate a pH gradient, (b) at least one indicator dye, and component (c) a charge transport material, and optionally component (d) a matrix material. Components (a), (b), (c), and (d) are different from one another. The standard reduction potential of component (a) is less than the standard reduction potential for the other components. If component (c) is a fluid, the composition further comprises the matrix material component (d).

A sixth embodiment of the invention is an article comprising a film further comprising the composition of the fourth or fifth embodiment located on a substrate.

In a seventh embodiment, the invention is an article comprising a film further comprising the composition of the sixth embodiment located on a substrate.

According to an eighth embodiment, the invention is a method for assembling an electrochromic display device. The method comprises several steps. The steps begin with providing an electrochromic ink containing ionic species. A first secondary competitive binder is then added and mixed with the electrochromic ink. Preferably, a second secondary competitive binder can also be added and mixed. Next, a gel-forming polymer which is insoluble in the electrochromic ink at room temperature is added and mixed with the mixture of the electrochromic ink and the secondary competitive binder. That mixture is then applied by screen printing or stencil printing onto a substrate which is heated at a temperature sufficient to cause the mixture to gel.

These and other features, aspects, and advantages of the present invention will become better understood with regard to the following description, appended claims, and accompanying drawings.

DETAILED DESCRIPTION OF THE INVENTION

Figure 1:
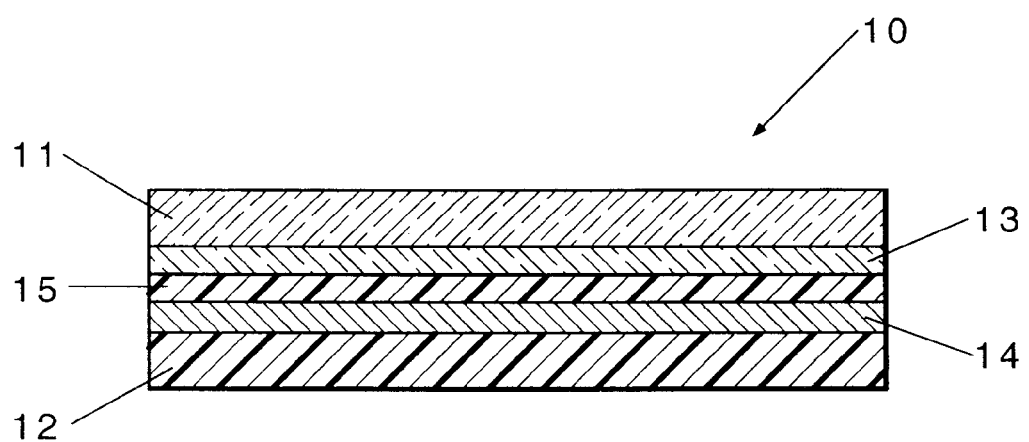
FIG. 1 is a cross-section of a schematic (not to scale) of an exemplary device of this invention.

FIG. 1 shows a cross-section of an exemplary device 10 of this invention. This exemplary device comprises substrates 11 and 12 and corresponding electrodes 13 and 14. The substrates may be any known surface, such as plastic sheets or films, glass, wood, etc. On each substrate is found at least one electrode. At least one of the substrates 11 is substantially transparent. The electrode 13 found on the transparent substrate 11 is also substantially transparent.

Examples of such electrode materials include indium tin oxide (ITO) or any other transparent conductive metal oxide, as well as thin transparent films of metals such as gold (either of which may optionally be coated with a protective barrier, such as titanium dioxide or derivative, silicon dioxide or derivatives or any conductive polymers and their derivatives, including but not limited to: poly(3,4-ethylenedioxythiophene) (PEDOT), polyaniline, polythiophene, polypyrrole, and polyphenylenevinylene (PPV)). A substantially transparent conducting polymer could also be used alone as the electrode, as long as the resistivity is low enough to provide adequate current flow. Other hard coats, as well as solvent and/or oxygen barrier layers, may be added to meet the requirements of the system.

Between the two electrodes is found the electroactive composition 15. The device is viewed looking at the surface of substrate 11. The direction in the plane of the substrates is the longitudinal direction L. The direction perpendicular to the plane of the substrates is the axial direction A. While the device shown is planar, other devices could easily be made having curved, shaped or flexible substrates.

One or both electrodes 13 and 14, or the electroactive composition 15, may be present in a pattern, shape or configuration so as to enable an image corresponding to the pattern shape or configuration to be viewed when a voltage is applied to the device. The power supply may be a battery or any other power source with a switch or simple circuit or computer chip. Optionally, one time operation of the cells can be performed without an external power source or battery as the cell can itself function as a galvanic cell.

Some specific, non-limiting examples of configurations and modes of operation follow. For example, either electrode 13 or 14 could be applied in a fixed shape, for example, by etching, lithography or photolithography or one of the electrodes could be masked with a transparent insulator to produce a fixed image that may be turned on and off by application of a voltage to the device. Alternatively, composition 15 and an insulating material could form a pattern between the electrodes. In addition, the electroactive material may be placed in selected regions of the device and the front substrate may be printed on directly or a colored mask could be placed on the front of the device to set the electronic image. The image may or may not be color matched to the material depending on the desired asthetics of the device.

The display may also be addressed using rows and columns, e.g., passive address system. In this system, electrodes 13 and/or 14 contain patterned conductive regions in opposite directions, resulting in a matrix or grid. When voltage is applied on a single row of the grid, a voltage is also applied on a single column. At the crossover point, sufficient voltage is present to cause a color change at that location. The power source for this scheme may be any conventional passive matrix driver, as long as the driver is capable of supplying an adequate amount of current. Due to the nature of preferred electrochromic systems having gelled active layers and using pH dye for the color change, a non-linear optoelectronic color response to voltage pulses is seen similar to what would be seen in a pH titration curve. This non-linear optoelectronic response makes the materials of this invention particularly suitable for use in passive matrix display devices, because they show "memory" and resistance to cross-talk.

In a third system, for high contrast, low content applications, the material may also be addressed using segments in which either 13 or 14 is patterned with a conductive material. In this case, the electronics driver would contain traditional segmented display drive electronics, such as those used in digital alarm clocks, etc.

Finally, for high content and high contrast applications, the device could be addressed using direct or active matrix drive. In the case of direct drive, each pixel could be activated independently or simultaneously using a drive chip. In the case of active matrix, each pixel on either 13 or 14 could contain individual transistors, with the opposite electrode serving as the ground electrode. The transistors could be individually patterned, deposited, or printed. Any known method for making electronics drivers for active matrix devices may be used. See, e.g., Society for Information Displays, Seminar Lecture Notes, Volume 1: May 22, 1995, M-5/1–33: Active-Matrix LCDs. However, low cost, flexible active matrix drive technologies, such as fluidic self-assembly, see, e.g., U.S. Pat. No. 5,545,291, are particularly suitable.

The rear electrode could be any conducting material which may or may not be transparent including: metals, metal oxides, metal or metal oxide-filled polymers, graphite filled polymers, or other conductive inks. Chemically inert and nonelectroactive materials are preferred as they would not participate in the electrochemical reaction. The inks and/or polymer systems could, be printed or applied using traditional methods such as described above. A combination of materials may also be used to enhance current distribution. For example, a ring of a more conductive metal or other highly conductive material may surround the electrode in order to improve current distribution across the electrode surface. In addition, layering of different conducting materials may be used to optimize conductivity and limit reactivity and/or galvanic activity. It is preferred that the layer in contact with electrochromic materials be inert (i.e., materials such as graphite or carbon, properly doped metal oxides, or noble metals such as gold or platinum).

The thickness of the composition layer 15 is preferably greater than about 10 μm, more preferably greater than about 25 μm, most preferably greater than about 50 μm and preferably less than about 1500 μm. However, thickness may vary within and without that range depending upon requirements of the particular application and particular makeup of the composition. Below 10 μm power requirements may become excessive. In addition, spacer beads may be required to prevent shorting. At low thickness, specialty clean environments may also be required to prevent dust particles from interfering with optical activity.

The first component (a) of the composition is any compound that undergoes a reversible redox (i.e. electron transfer) reaction, such that a pH change occurs in the region surrounding the compound, i.e., component (a) generates protons, hydroxide ions, or other components that cause a pH shift as a result of a redox reaction. Component (a) should preferentially undergo the electron transfer or redox reaction in the cell. The term preferentially undergoes the electron transfer reaction means that the electron transfer or redox reaction primarily occurs on a particular component and/or its redox couple (if any) and redox reactions involving other components are insignificant. Preferably 70%, more preferably 80%, and most preferably more than 90% of the redox reactions occurring within the composition occur on component (a) and/or its redox couple. While some redox reactions may occur with some other components, such reactions with other components occur at a significantly lower rate, later in the life of a device and are considered side reactions. The reaction electron transfer or redox reaction should occur at the interface of component (a) with the electrode surface.

There are a number of ways to determine or approximate whether a component will preferentially undergo the redox reaction relative to the other components. In one embodiment, the standard reduction potential of component (a) should be less than for the other component in the device. Alternatively, the electrode potential, E, of component (a) is less than the electrode potential for the other components of identical sign in the half cell reaction, as described by the Nernst equation. The Nernst equation links the actual reversible potential of an electrode, E, to the standard or idealized reduction potential, E°, according to the following equation:

$$E=E^0-(RT/zF)\ln(a(RED)/a(OX)),$$

where R is the universal gas constant, T is the absolute temperature, z is the charge number of the reaction at the electrode surface, and F is the Faraday constant. The notation a(RED) represents the chemical activities of all reduced species at the cathodic electrode surface, while a(OX) represents the chemical activities of all oxidized species at the anodic electrode surface. If component (b) does not participate in the redox reaction at the counter electrode under the applied voltage conditions (i.e. E(species)<E(applied)), the secondary redox couple, component (f), may be added to complement component (a), serving as the secondary half-cell reaction. If component (b) is irreversible or quasi-reversible, component (f) may be added to prevent component (b) from participating in the half cell reaction. Therefore, it is preferred that the electrode potential of component (f) be closer to zero that that of component (b), assuming they are of the same sign. If component (b) is the same sign as component (a), it is preferred that the electrode potential of species component (a) be closer to zero than that of component (b).

Another method of determining which component will preferentially undergo the electron transfer reaction can be depicted by CV cyclability curves for each electroactive component, as demonstrated in Example 11. Measured (as opposed to calculated) values of the oxidative and reductive peaks of the individual components, as well as repeated cyclability (i.e. change in current versus number of cycles) serve as a simple means to define reaction preference at each electrode surface, as well as determine the electrochemical stability of the entire system, respectively. Electrochemical stabilization of the indicator dye is important when the dye undergoes irreversible or quasi-reversible redox reaction.

Examples of compounds suitable for use as the first component (a) may include but are not limited to any number of organic or inorganic redox reagents, including but not limited to: iodates, bromates, sulfates, metal hydroxides, phosphates, ketones, aldehydes, quinones, quinolines, sulfur compounds, hydroxybenzenes, carboxylic acids, polyoxometallates, and amines. Materials such as hydroquinone and other quinone derivatives such as methylquinone and duroquinone, which are highly reversible, do not undergo many side reactions, and have a relatively low standard reduction potential are particularly preferred. Component (a) is preferably present in amounts of greater than 0.01 percent, more preferably greater than 0.1 percent based on total weight of the composition. Component (a) is preferably present in amounts less than about 15 percent, more preferably less than about 10 percent, based on total weight of the composition. All percentages herein are weight percents based on total weight of the composition, unless explicitly indicated otherwise.

In addition to component (a), component (f) is preferably added as a secondary redox couple which would undergo complimentary redox reaction. A complimentary redox reaction is defined as the material which undergoes the second half of the redox reaction (i.e. one of the preferential half reactions at the electrode surface). Furthermore, component (f) should be reversible (electrochemically) and chemically stable in the system. Examples of compounds suitable for use as the secondary redox couple (f) may include but are not limited to any number of organic or inorganic redox reagents, including but not limited to: iodates, bromates, sulfates, metal hydroxides, phosphates, ketones, aldehydes, quinones, quinolines, sulfur compounds, hydroxybenzenes, carboxylic acids, polyoxometallates, and amines. Materials such as hydroquinone and other quinone derivatives such as methylquinone and duroquinone, which are highly reversible, do not undergo many side reactions, and have a relatively low standard reduction potential are particularly preferred. When used, Component (f) should be present concentration ranges equal to those used in component (a) and at ratios optimized for the individual cell (i.e. electrochemical system). Thus, Component (f) is preferably present in amounts of greater than 0.01 percent, more preferably greater than 0.1 percent based on total weight of the composition. Component (f) is preferably present in amounts less than about 15 percent, more preferably less than about 10 percent, based on total weight of the composition. All percentages herein are weight percents based on total weight of the composition, unless explicitly indicated otherwise.

The second component (b) in the composition is an indicator dye that changes color when a change in pH occurs. Any known pH indicator dyes or their derivatives could be used. A single indicator dye may be used or they may be used in combination to give a variety of colors. The response and chromaticity of various dyes can be optimized by changing the starting pH of the system and/or the proton or hydroxide generator. Non-limiting examples of suitable indicator dyes include phenylthalein, bromocrescol purple, phenol red, ethyl red, quinaldine red, thymolthalein, thymol blue, malachite green, crystal violet, methyl violet 2B, xylenol blue, cresol red, phyloxine B, congo red, methyl orange, bromochlorophenol blue, alizarin red, chlorophenol red, 4-nitrophenol, nile blue A, aniline blue, indigo carmine, bromothymol blue, etc. Dyes that yield more than two different colors, depending on pH, are of particular interest as they would enable multi-color images with use of a single dye. Thymol blue is one example of such a dye—it is yellow under neutral conditions, red under acidic conditions, and blue under basic conditions. Dyes that are very pale or transparent in one form are also desirable as they may allow more flexibility in color selection in the display. Finally, indicator dyes, which change colors at varying pH levels and are of varying colors, may be combined to tailor the colors in the display to the users desire or to attain multi-color or possibly full color displays. The indicator dye is preferably present in amounts of at least 0.01 percent, more preferably 0.1 percent by weight. The dye is preferably used in amounts less than 15 weight percent, more preferably less than 5 weight percent. When combinations of dyes are used, the total amount of dye in the composition should preferably be less than 15 percent. Other non pH sensitive dyes or pigments may be used to alter the asthetics of the display as well, as long as the materials do not parasitically alter the redox chemistry, such that the system can no longer meet the application requirements.

Component (c) is a charge, (i.e. ion) transport material. This material may be any known material that is capable of transporting the necessary ions from the redox material to the indicator dye. However, component (c) itself does not substantially undergo a redox reaction.

Examples of materials which can be used as component (c) include aqueous solutions, protic solvents, and solid electrolytes. The aqueous solutions preferably comprise electrolyte concentrations of greater than or equal to 0.01 percent and less than or equal to 50 percent and more preferably less than or equal to 0.5 percent based on weight of the solution. Suitable electrolyte components include salts, such as, for example, sodium, lithium, magnesium, or calcium sulfate, percholorate or chloride, as well as organic ionic materials, such as amines and organic acid electrolytes. Non-chloride electrolytes are preferred because chloride is fairly reactive with metal electrode surfaces. The presence of a high concentration of other ions utilizes the common ion effect to reduce the neutralization driving force of the protons and hydroxide ions, thus enhancing open circuit lifetime. Optionally, the electrolyte solution would contain one or more buffer components, depending on the operating pH range of the system. A buffer is defined as a material that resists changes in pH, as a result of addition of small amounts of acids or bases. By adding the appropriate pH buffer(s) to component (c), lifetimes may be enhanced by avoiding pH extremes at the electrodes, as previously described. Examples of buffer components include, but are not limited to: weak acids such as carboxylic acids (formate, acetate, citrate, fumaric, glycolic, oxalic, etc.), weak bases such as amines (ethylenediamine, triethylamine, etc.), or zwitterionic materials such as amino acids or biological buffers (CAPS, MES, MOPS, TAPSO, or AMPSO). In addition, components a, b, c, d, e or f may also serve as one or more of the buffer components in the system. However, in order to optimize the response time of the system, it is preferred that none of the materials of construction buffer in the color transition range of component B. For example, component C containing a phosphate buffer, which buffers at a pH of 2.5 and 7.5, would be suitable for use with bromocresol purple, which has a color transition around 5.5. Preferably, the buffer should not negatively participate in the redox reaction.

The aqueous solution may also comprise a co-solvent. The co-solvent may be useful to enhance component solubility, modify conductivity, modify rheology of the composition and modify adhesion to the surface of the electrode layer. Potentially useful co-solvents include, but are not limited to: alcohols such as isopropanol and ethanol, aldehydes, ketones, ethers, formamides, or common electrochemical solvents such as acetonitrile, N-methylpyrolidinone, and proplyene carbonate. Co-solvents with high dielectric constants and high reduction potentials (i.e., low electroactivity and low protic activity such as propylene carbonate) are particularly preferred.

A nonaqueous system could be used as component (c), provided the redox component can cause an adequate pH shift and there is adequate polarity to provide good ionic conductivity. Preferably, these systems comprise an electrolyte component as specified for example above, in a protic solvent. Suitable protic solvents that could be used in a non-aqueous system include, but are not limited to: propylene carbonate, dimethyl formamide, formamide, N-methyl pyrrolidinone, acetonitrile, dimethylsulfozide, alcohols (methanol, isopropanol, ethanol, etc.), pyridine, and 1,4-dioxane. In addition, a low molecular weight glycol ether such as ethylene glycol, propylene glycol, polyethylene glycol, or a derivative therefore may be used. Nonaqueous systems are preferred when electrode corrosion, evaporative water loss, and water electrolysis become an issue. Mixed, immiscible solvents or materials, such as aqueous/organic or polymeric dispersions or microencapsulated aqueous systems may also be used to prevent contact between a corrosive aqueous electrolyte and the electrode surface. Additionally, low proton content allows the application of a greater drawing voltage (without significant system hysteresis) which speeds up kinetics.

A solid system may also be used as the charge transport material. Examples of such systems include conductive polymers such as polyacrylamidomethyl-propanesulfonate (POLYAMPS), polystyrene sulfonic acid (PSSA), and copolymers, and blends and block copolymers thereof. The conductive polymer may be used alone (i.e., a solid electrolyte system) or in a swollen aqueous or solvent solution. In addition, the electrolyte material may be physically separated from the redox materials and/or the indicator dye, whereby the dye and/or redox active species are placed on either side of the electrolyte in a "battery-like" structure. The materials could be applied by any number of manufacturing processes, including but not limited to printing processes such as silk-screening, ink jetting, roll printing, or stenciling.

The amount of ion/charge transport material in the system may depend upon the efficiency of the material in transporting charge and/or ions, as well as the relative amounts of additional additives (such as components (d) and (e)) that are desired. However, the amount is preferably at least 5, more preferably at least 10, and most preferably at least 20 weight percent and is less than 99.98 weight percent, more preferably less than 90 weight percent and most preferably less than 70 weight percent.

Preferably, embodiments of the composition also comprise (d) a matrix material. The matrix material may provide structural integrity to the device. This will aid printability and processability. In addition, or alternatively, the matrix material may be used to control ion transport, and diffusion rate of the other materials in the composition. Limiting ion transport and diffusion of components in the longitudinal direction L increases resolution and stability over time of the image formed. Limiting ion transport and diffusion in all directions increases open circuit lifetime and optical density. Thus, according to one embodiment, the matrix material may comprise a skeletal, porous or framework structure that is saturated with the other components of the composition. For example, an open cell polymeric foam, a honeycomb structure, a screen, a mesh, spacer particles or paper may be saturated with the other components or have the other components absorbed into the open regions of the structure. Naturally and synthetically occurring polymers are particularly suitable for supplying such skeletal or porous structures. Alternatively, or in addition to a skeletal matrix material, viscosity modifier or diffusion inhibitor may be blended directly with components (a), (b) and (c). This material preferably provides consistency to the composition, as is found in a gel or a paste. Polymers and other viscosity modifiers are particularly preferred. Multiple matrix materials may also be added. For example, fumed silica is known to disrupt the crystalinity of glycol ethers, thus increasing the conductivity of the system while maintaining good structural integrity. Precise choice of such a matrix material will depend upon compatibility with the solution or solvents that are chosen. Nanocrystalline particles or sol gel systems may also be added as well to optimize the Theological properties of the system while maintaining the required transport properties. Examples of matrix materials include silicates such as silicon dioxide, aluminates, or zirconium oxide, barium titanate and other particles or polymeric materials such as, hydroxyethyl cellulose, polyethylene glycols, polyethylene oxides, polyurethanes, polyacrylates, polysulfonic acids, polyacetates, latexes, styrene divinylbenzene polymers, and polypropylenes. The matrix material is preferably present in amounts of 1 to 90 percent and more preferably 10 to 90 percent by weight. The matrix material may either be blended or polymerized/cured in-situ (i.e., photopolymerized or thermally polymerized) from its monomer. As the monomer is not polymerized, the viscosity of the material will be more like that of water, allowing the material to be easily filled into a cell or incorporated into a foam or paper, as opposed to being applied as a paste.

The matrix material may optionally contain weak acid and/or weak base end-groups, which serve to buffer the pH of the system as well. In addition, the matrix material may provide opacity to the composition. Such opacity is desirable as the electrochromic process is a surface phenomenon (occurring at the interface of the electrode and the composition). With an opaque composition providing reflection near the surface of the cell, only the first few microns at the surface must be dyed in order to see the color change. This reduces the amount of time required to generate a color change allowing switching times much faster than traditional electrochromic window displays. Optionally, in addition or instead of a matrix material, an opacifying agent (e) may be used. Suitable opacifiers include particles, such as $TiO_2$, latexes, barium titanate, and other particles. Component (e), when used, is preferably present in amount equal to or greater than 0.1 percent and more preferably greater than or equal to 1.0 percent. Component (e) is preferably present in an amount less than or equal to 75 percent by weight and more preferably less than or equal to 40 percent by weight. Component (e) may be the same as component (d). They may be the same material or materials providing a dual function of matrix and opacifier.

The devices are easily assembled using known processes. For example, an electrode may be applied to a substrate using known methods, such as vapor deposition, electroplating, etc. The electrode may be patterned as desired by photolithography, etching, application using a mask, etc. The composition 15, if in the form of a film, may then be laminated to the substrate bearing the electrode. If the composition is a fluid or paste, it could be coated by known methods, such as blade coating, stenciling, spin coating, etc., or could be applied as a pattern via conventional drum printing, screen printing or ink jet printing. Alternatively, the composition could be applied to a carrier substrate with an optional release film on the opposite side of the composition. The release film could be removed prior to adhering the composition to a permanent substrate comprising an electrode or pattern of electrodes. The second electrode and its associated substrate, if any, would then be applied over the composition 15, via printing, vapor deposition, lamination, etc.

Screen printing or stencil printing are desirable assembly methods because they involve a minimum amount of assembly steps. High viscosity electrochromatic inks of this invention can be efficiently screen or stencil printed if viscosity is controlled.

Screen printing or stencil printing electrochromic inks including preferably the compositions of this invention, can be done in several steps. The steps begin with providing an electrochromic ink preferably containing ionic species. A secondary competitive binder is then added and mixed with the electrochromic ink. Next, a gel-forming polymer in which the electrochromic ink is insoluble at room temperature is then added and mixed with the mixture of the electrochromic ink and the secondary competitive binder. That mixture is then screen printed or stencil printed onto a substrate which is heated at a temperature sufficient to cause the mixture to gel. Without wishing to be bound, Applicants believe heat causes the gel-forming polymer to unwind and hydrogen bond with itself and the secondary competitive binder.

This method is useful both with regard to the electrochromic compositions of this invention as well as other known electrochromic compositions.

A preferred embodiment of this method comprises several steps. The first step is to dissolve an electrochromic ink (preferably the ink comprises ionic components) in a non-aqueous solvent. The next step is adding and mixing a polymer containing non-ionic viscosity modifying polymer having a number average molecular weight greater than about 20,000, preferably in the range of about 50,000 to about 100,000 from the group consisting of polyethylene oxide, polyethylene glycol, polypropylene oxide, polyvinyl alcohol, polyvinyl acetate, polyacrylamides, poly(vinyl pyrrolidone), polysaccharides, cellulose derivatives, methacrylic polymers, or poly(2-ethyl-2-oxaoline) into the mix. As a third step a low molecular weight polymer having a number average molecular weight from about 200 to about 600 from the same group of polymers as listed in step 2, is then added to the resulting mixture and mixed with it. Finally, a compound of molecular viscosity average molecular weight from about 300,000 to about 8,000,000 again selected from the group of polymers of Step 2 is added and mixed. The mixture is then applied to a substrate. The substrate is then heated at between 70 to 100 degrees C. for one to 10 minutes gelling the material resulting in a thickened, non-flowable electrochromic paste. Finally, a substrate is applied to the gelled material/substrate completing the cell.

Lower molecular weight polymer is added to prevent the gel forming polymer from gelling immediately upon addition to the electrochromic ink. These lower molecular weight materials act as secondary competitive binders. They complex with the available dye, salt, and electroactive species within the system. Thus, through the proper order of addition of species and the proper ratios of the polymers to the complexing species within the system gelation of the electrochromic material is controlled using heat. Polyethylene glycol is the preferred low molecular weight species. Polyethylene oxide is the preferred intermediate and high molecular weight species.

Examples of materials which can be used as ionic species include sodium chloride, lithium magnesium chloride, or calcium sulfate, percholorate or chloride, as well as organic ionic materials, such as organic ammonium, carboxylic acid, and sulfonic acid salts. The preferred ionic species mass loading ranges from 1 to 10 percent by weight with sodium sulfate being the preferred ionic species.

The devices of this invention may find use in a variety of applications, including low cost applications, due to the simplicity of the manufacturing process and ready availability of the materials needed to make the devices. Examples of such applications in the publishing industry, including but not limited to: greeting cards, direct mail, free-standing inserts, coupons, bookmarks, postcards, movie/event tickets, as well as higher content applications, such as e-books, e-newspapers, e-magazines, e-catalogs, e-directories, e-forms (tax returns, warranties, etc.), maps, menus, workbooks and educational pieces. Other applications are in the area of secure/value documents, such as, stored value/smart cards (credit cards, debit cards, loyalty cards, health cards, phone cards, transit cards), travelers checks, passports, visas, and RFID tags. The material could also enable extremely low cost handheld devices like cellular phones, pagers, PDAs, games, toys, watches, and calculators. The high contrast and potentially low cost may also lend itself to advertising applications, such as point-of-purchase displays, billboards, transit advertising, floor graphics, hanging banners, vehicle graphics (bus, taxi, subway, train displays), shopping cart displays, shelf-edge labels, packaged goods applications (on-product advertising), and shopping bags (plastic or paper). Textile applications such as wearable displays (display embedded into articles of clothing, e.g., coat pocket, ski jacket) and integrated displays (display embedded into upholstery, e.g., car seat, or laminated onto restaurant table-top) are also possible. Other applications include disposable/low-cost cameras, eye charts, changeable wallpaper, novelty products, toys, and games. These materials could be especially valuable in outdoor applications where sunlight readability is paramount. These type of applications include: industrial process equipment, gas pumps, road constructions signs, and even as information displays on the exterior of automobiles or mail delivery notices on mailboxes.

EXAMPLES

Example 1

The following reagents were mixed in a small mortar and pestle: 1.0 gram hydroquinone; 1.0 gram titanium dioxide; 0.5 gram bromocrescol purple; 0.5 gram 600,000 MW (number average) polyethylene oxide; 0.5 gram 8,000 MW (number average) polyethylene glycol. The materials were ground well. Next, 1.5 grams of isopropanol was added and mixed well. Finally, 1.9 grams of a saturated aqueous solution of sodium chloride was added and mixed. The material was then allowed to sit covered with Parafilm for 24 hours before use. The material was then pressed between 2 pieces of 100 Ω coated glass and 2 pieces of 100 Ω ITO PET plastic (both purchased from Delta Technologies, Stillwater, Minn.), which serves as the electrodes. The electrodes were connected to a variable DC power supply with alligator clips. The material began to image (change from bluish to yellow) beginning at around +/−0.7 volt on both the ITO glass and the ITO coated PET plastic; however, a large change in color was noticeable at 1.5 volts. The color contrast and response time increased with increase voltage (see below). The material properties were measured using the following test equipment:

Minolta Luminescence Meter (contrast ratio and brightness)
BK Model 4017, 10MZ sweep function generator
HP6209B DC power supply
455B oscilloscope with a photodiode probe (response time and power)
Pretek micrometer (film thickness)

The results for this device for voltage versus luminance and contrast are as shown in the following table. Contrast is luminance in the bright state/luminance in the dark state.

TABLE I

| Voltage | Yellow (ft-lamberts) | Purple (ft-lamberts) | Contrast |
|---------|----------------------|----------------------|----------|
| 1.5     | 50                   | 5.5                  | 9:1      |
| 3       | 50                   | 4.8                  | 10.4:1   |

Measured Composition Properties

| | |
|---|---|
| Contrast Ratio | EC - 8:1 to 10:1 (voltage and time dependent) |
| Color Contrast | Deep bluish purple/Yellow |
| Reflectivity of yellow | 70 percent versus white paper (under ITO glass) |
| Drive Voltage | >0.7 V |
| Power | 4 mW/in.$^2$ at 1.5 volts |
| Response time | 0.5 sec at 1.5 volts |
| Open circuit lifetime* | 5 to 100 sec. (15 sec. = typical) |
| Gap thickness | ~500 microns |

*Defined as the time to lose 50 percent contrast.

Example 2

The following reagents were mixed in a small mortar and pestle: 1.0 gram $KIO_3$; 1.0 gram titanium dioxide; 0.5 gram bromocrescol purple; 0.5 gram 1,000,000 MW (weight average) hydroxyethyl cellulose. The materials were ground well. Next, 2.5 grams of an aqueous saturated solution of sodium chloride was added. The composition was greenish in color. The composition was then placed between two pieces of ITO coated glass and plastic (PET), as in Example 1. The material changes from yellow to blue at +/−1.5 volts.

Example 3

The same recipe and experiment was made as in Example 1, except ethyl red indicator was used instead of the bromocresol purple dye. The material imaged well from red to yellow at 1.5 volts on both ITO glass and plastic (PET).

Example 4

The same recipe and experiment was made as in Example 1, except, in this case, a dilute solution of HCl was added drop wise until the material turned completely yellow. The material imaged well at 1.5 volts. Note: this could allow only part of the display to be imaged and to erase without driving the entire display to achieve high contrast. However, the material could only be driven to a dark green at 1.5 volts as opposed to a vibrant blue. That was because additional protons had to be removed from the dark region to achieve the same color change.

Example 5

To determine if passive matrix addressing was possible, the following data was taken using the recipe in Example 4. At 0.5 volts no color change was noticed. At 1.0 voltage the yellow material began to turn light green indicating a threshold in the optoelectric curve and the ability to do passive matrix addressing at limited contrast ratios.

Example 6

To demonstrate the importance of using a redox compound, such as hydroquinone to enhance lifetime and improve contrast, two compositions (A and B) were prepared as in Example 1, except Composition B contained no hydroquinone. The materials were both placed between two pieces of ITO glass at a thickness of about 500 microns. The plates were then attached to a square wave pulse generator. The materials were cycled at +/−2.0 volts at a rate of 0.5 Hz (peak to peak). The contrast of composition A was much greater than composition B. In addition, after only 20 cycles (i.e., turning the voltage on and off 20 times), composition B turned yellow (acidic) and quit functioning. Composition A was then placed between two new pieces of glass and sealed with silicon grease. The cell was cycled at 1 Hz at +/−2.1 volts for about 6 days (500,000 cycles peak to peak) before failure.

Example 7

The same recipe and experiment was made as in Example 1, except instead of using the polymer blend, the composition (without polymer) was soaked into a piece of 10 micron Teflon filter paper. The material imaged well from orange-yellow to bluish-purple at 1.5 volts on both ITO glass and plastic.

Example 8

The same recipe and experiment was made as in Example 1, except instead of using the polymer blend, the composition (without polymer) was soaked into a piece of 800 micron piece of styrene divinylbenzene open cell foam. The material imaged well from orange-yellow to bluish-purple at 1.5 volts on both ITO glass and plastic. Interestingly, the material also demonstrated reasonable open circuit lifetime (>30 sec.).

Example 9

In order to demonstrate the value of addition of a buffer component in replacement of a salt-based electrolyte to protect the electrode surface, two buffer components were prepared. The following reagents were mixed in a small mortar and pestle: 1.0 gram hydroquinone; 1.0 gram titanium dioxide; 0.5 gram bromocrescol purple; 0.5 gram 600,000 MW polyethylene oxide; 0.5 gram 8,000 MW polyethylene glycol. The materials were ground well. Next, 1.5 grams of proplyene carbonate was added and mixed well. Finally, 1.9 grams of a 170 mM aqueous solution of the electrolyte was added and mixed. In composition A, the electrolyte was sodium chloride. In composition B, the electrolyte was sodium formate. Both materials were pressed to a thickness of about 500 microns between ITO coated PET. Plastic was used, as ITO on plastic is more prone to acid and base decomposition than on glass. Both materials were cycled at +/−4 volts peak to peak with a cycle time of 0.1 Hz. After about 2 hours, Composition A was no longer functional, while no loss of function (color contrast or speed) was seen even after 10 hours with Composition B. It is noted, however, that under acidic conditions, composition B did not turn as bright yellow, indicating that the buffer is in fact limiting the pH of the system.

Example 10

In order to demonstrate the lifetime increase by use of less electroactive solvents, propylene carbonate was substituted as a cosolvent for isopropyl alcohol and cycled at +/−2V for 1 second on 100 Ohm per square ITO coated PET. The materials with propylene carbonate continue to cycle between color states after 8 hours, while the isopropanol bases system is not functional after only 3 hours significantly longer than the cell containing isopropyl alcohol. In addition, sodium sulfate was substituted for sodium chloride to prove the effectiveness of using a less reactive, corrosion inhibiting electrolyte in substitution for sodium chloride. The result was significant, in that cycle lifetimes were approximately 8 hours for the propylene carbonate solutions containing sodium chloride, but extended to 95 hours when sodium sulfate was substituted for the sodium chloride. Finally, the water was removed completely from the systems to test the effect of water on electrode corrosion. It was found that removal of water significantly improved lifetimes of the device by reducing corrosion on the electrode surface, as well as preventing the cells from drying up on plastic substrates. Removal of water resulted in lifetimes of 310 hours versus 95 hours with water. It is suspected that there is still some water present, due to the hygroscopic nature of propylene carbonate and glycol ethers. However, it is known that the activity of water in nearly anhydrous system is greatly reduced—due to the fact that the water is highly associated with the large quantity of solvent—and typically does not behave as "bulk water". Thus, systems with small amounts of water can be successful when bulk water can be highly unsatisfactory.

Example 11

A CV experiment was performed using a Princeton Applied Research, model 173, potentiostat and a plotter.

Platinum guaze was used for the working and counter electrodes and silver wire for reference electrode. In a mixture of 12 ml of 1:1 n-methyl pyrrolidinone: propylene carbonate was added about 100 mg of w/(0.1 g) tetrabutyl ammonium tetraborate. 500 mg each of the individual redox species and dyes were added both individually and corporately and the voltage was swept at 200 mV/sec to +/−2V and the current was continuously plotted over time. For bromocresol purple indicator dye alone, the major oxidation and reduction peaks disappear after only 3 hours, indicating decomposition and/or polymerization of the dyes species. To further support this, it is noted that the solution was initially a deep brownish red and after the experiment the solution turned a pale yellow with a large amount of black insoluble material present. Next, an identical solution of hydroquinone was tested. After 20 hours, there was almost no change in the CV curve profile or peak positions, with only minor peak broadening over the course of the experiment. When the experiment was repeated with both dye and hydroquinone together in the electrolyte, the major oxidation and reduction peak again disappears for the bromocresol purple after only 3 hours, that hydroquinone, while excellent at providing the pH gradient in the system, is not capable of stabilizing the dye in and of itself. In order to probe secondary redox couples methyl 1,4-benzoquinone was chosen as a possible secondary or sacrificial redox couple. 500 mg of Methyl 1,4-benzoquinone was added to the electrolyte solution and tested. After 20 hours, there was almost no change in the CV curve profile or peak positions. As a final experiment, methyl 1,4-benzoquinone was combined with the bromocresol indicator dye and tested. After 20 hours, the CV curve remained virtually unchanged; in addition, the solution color and dye solubility had not changed, indicating that the methyl 1,4-benzoquinone did stabilize the dye and works well as a secondary redox couple. To further test the validity of the secondary redox couple in an actual cell, the following mixtures were made:

Mixture 1

| Ingredient | Grams | |
|---|---|---|
| 1. Bromocresol purple | 0.23 | component (b) |
| 2. TiO2 | 2.29 | component (e) |
| 3. Hydroquinone | 0.46 | component (a) |
| 4. Sodium sulfate | 0.31 | component (c) |
| 5. Polyethylene oxide | 0.31 | component (d) |
| 6. Propylene carbonate | 0.46 | component (c) |
| 7. 1-Methyl-2-Pyrrolidnone | 0.46 | component (c) |

Mixture 2

| Ingredient | Grams | |
|---|---|---|
| 1. Bromocresol purple | 0.23 | |
| 2. TiO2 | 2.29 | |
| 3. Hydroquinone | 0.46 | |
| 4. Sodium sulfate | 0.31 | |
| 5. Polyethylene oxide | 0.31 | |
| 6. Propylene carbonate | 0.46 | |
| 7. 1-Methyl-2-Pyrrolidnone | 0.46 | |
| 8. Methyl-1-4, Benzoquinone | 0.23 | component (f) |

Each mixture was mixed well in a mortar and pestle and then sandwiched between 2 pieces of 100 Ohm ITO-coated PET (thickness ~250 microns), and sealed with a silicone sealant. Mixture 1 materials were cycled at +/−1.5 volts at a rate of 1 Hz (peak to peak). After about 200,000 cycles mixture 1 lost over half of its original contrast, while mixture two shows almost no contrast loss or decoloration. Mixture two lasts over 1 million cycles before failure.

Example 12

An electrochromic display material was produced by the following method. All dry materials were well pre-ground before use. Methyl-1.4-benzoquinone (0.05 g) was dissolved completely in propylene carbonate (1.50 g). Then bromocresol purple (0.10 g) or phenol red (0.10 g), sodium sulphate (0.20 g), polyethylene oxide (MW=100,000, 0.20 g) and titanium dioxide (1.80 g) were added into the solution and mixed well. Furthermore, hydroquinone (0.10 g) and polyethylene glycol (MW=200, 0.15 g) were added and mixed. Finally, polyethylene oxide (MW=600,000, 0.15 g) was added to the mixture. The resulting mixture had a low viscosity (30,000 cP) and was light green in color. In the case of phenol red, 0.15 g of hydroquinone was used instead of 0.10 g.

The low viscosity electrochromic display paste was sandwiched between two pieces of 100 Ω ITO coated PET plastic films (purchased from Sheldahl). The substrate/paste/substrate was then pressed together evenly to obtain a paste layer with a thickness of approximately 0.5–1.0 mm. The cell was placed into a 70° C. oven for 10 minutes. (or alternatively a 90° C. oven for 1 minutes). During heating, the display material between the ITO coated PET plastic films gells up increasing viscosity as well as acting as an adhesive towards the two ITO-coated sheets (causing them to stick together). The display unit was placed on a testing rig, under 1.5V, 1 cycle/2s square wave, and exhibits cell switching speeds (~200 ms) between the two color states typical of the electrochromic compositions of this invention. Viscosity measurements of the material after thermal curing indicated a viscosity of (350,000 cps). Visual observations over time (6 weeks) show that the material remains non-flowing and retained the higher thickness.

Example 13

To demonstrate that the electrochromic composition of this invention can be used in an actual screen printing process, a sample was prepared using the same recipe as in Example 12, except that 0.45 g of PEG and 1.2 g of propylene carbonate was used. The viscosity of the ink was measured to be 112,000 cps. A silk screening process was used to apply ink onto a 2 inch square piece of 100 ohm ITO coated PET using a 40 mesh plastic screen. The ink/substrate was then placed on a conveyer belt and ran through an oven at 90 degrees C. for 1 minute thickening the paste. The viscosity of the ink after gelation was measured to be >1,000,000 cps. An electrode backplane was then placed onto the thickened paste to form a 2 inch by 2 inch display consisting of an ITO front plane, an approximate 150 micron middle layer of thickened ink and an electrode back plane consisting of conductive silver ink on 5 mil PET. The display changed from an orange color to a deep violet color when 3 volts DC was applied.

What is claimed is:

1. A display device comprising at least two electrodes, and positioned between those two electrodes in such a manner to be visible a composition comprising:

(a) a non-aqueous compound that undergoes a reversible electron transfer reaction with a subsequent change in its protic state resulting in a pH gradient in the device, (b) at least one indicator dye, and (c) a charge transport material.

2. A display device comprising at least two electrodes, one being anodic and one being cathodic, and positioned between those two electrodes in such a manner to be visible a composition comprising:
   (a) a compound that undergoes a reversible electron transfer reaction with a subsequent change in its protic state resulting in a pH gradient in the device,
   (b) at least one indicator dye, and
   (c) a charge transport material
wherein components (a), (b) and (c) are different from one another and component (a) preferentially undergoes the electron transfer reaction at the electrode surface.

3. The device of claim 2 wherein the preferential electron transfer reaction occurs at an electrode surface.

4. The device of claim 2 wherein the electrode potential of component (a) is less than the electrode potential for the other components of identical sign in a half cell reaction.

5. The device of claim 2 characterized in that component (a) is present in an amount from 0.01 to 15 weight percent by weight, component (b) is present in an amount from 0.01 to 15 percent by weight, component (c) is present in an amount from 5 to 99.98 percent by weight and further comprising a matrix material component (d) present in an amount from 0 to 90 percent by weight, an opacifier component (e) present in an a amount from 0 to 40 percent by weight, and component (f) a secondary redox couple present in an amount from 0 to 15 weight percent by weight.

6. The device of claim 2 wherein component (a) is selected from the group consisting of iodates, bromates, sulfates, metal hydroxides, phosphates, ketones, aldehydes, quinones, quinolines, sulfur compounds, hydroxybenzenes, carboxylic acids and amines.

7. The device of claim 2 wherein component (b) comprises one or more indicator dyes or their derivatives selected from the group consisting of phenylthalein, bromocrescol purple, phenol red, ethyl red, quinaldine red, thymolthalein, thymol blue, malachite green, crystal violet, methyl violet 2B, xylenol blue, cresol red, phyloxine B, congo red, methyl orange, bromochlorophenol blue, alizarin red, chlorophenol red, 4-nitrophenol, nile blue A, aniline blue, indigo carmine, and bromothymol blue.

8. The device of claim 2 wherein component (c) comprises a salt and a solvent selected from the group consisting of propylene carbonate, dimethyl formamide, N-methyl pyrrolidinone, acetonitrile, dimethylsulfozide, alcohols, pyridine and 1,4-dioxane, ethylene glycol, propylene glycol or polyethylene glycol.

9. The device of claim 2 wherein component (c) is a solid electrolyte.

10. The device of claim 2 wherein the anodic electrode and the cathodic electrode are located on separate substrates and form electrode substrate composites and at least one of the electrode substrate composites is transparent.

11. The device of claim 2 wherein at least one of the electrodes or the composition is patterned to form an image when a voltage is passed across the composition.

12. The device of claim 5 wherein the matrix component (d) comprises a polymer or other viscosity modifier and the matrix is blended with the other components of the composition.

13. The device of claim 5 wherein the opacifier is selected from the group consisting of titanium dioxide, latexes, and barium titanate.

14. A display device comprising at least two electrodes, one being anodic and one being cathodic, and positioned between those two electrodes in such a manner to be visible a composition comprising:
   (a) a compound that undergoes a reversible redox reaction to generate a pH gradient between the two electrodes,
   (b) at least one indicator dye, and
   (c) a charge transport material wherein components (a), (b) and (c) are different from one another and the standard reduction potential of component (a) is less than the standard reduction potential for the other components.

15. The device of claim 14 characterized in that component (a) is present in an amount from 0.01 to 15 weight percent by weight, component (b) is present in an amount from 0.01 to 15 percent by weight, component (c) is present in an amount from 5 to 99.98 percent by weight and further comprising a matrix material component (d) present in an amount from 0 to 90 percent by weight, an opacifier component (e) present in an amount from 0 to 40 percent by weight, and a secondary redox couple component (f) present in an amount from 0 to 15 weight percent by weight.

16. The device of claim 14 wherein component (a) is selected from the group consisting of iodates, bromates, sulfates, metal hydroxides, phosphates, ketones, aldehydes, quinones, quinolines, sulfur compounds, hydroxybenzenes, carboxylic acids and amines.

17. The device of claim 14 wherein component (b) comprises one or more indicator dyes or their derivatives selected from the group consisting of phenylthalein, bromocrescol purple, phenol red, ethyl red, quinaldine red, thymolthalein, thymol blue, malachite green, crystal violet, methyl violet 2B, xylenol blue, cresol red, phyloxine B, congo red, methyl orange, bromochlorophenol blue, alizarin red, chlorophenol red, 4-nitrophenol, nile blue A, aniline blue, indigo carmine, and bromothymol blue.

18. The device of claim 14 wherein component (c) is a solid electrolyte.

19. The device of claim 14 wherein the anodic electrode and the cathodic electrode are each located on separate substrates and form electrode substrate composites and at least one of the electrode substrate composites is transparent.

20. The device of claim 14 wherein at least one of the electrodes or the composition is patterned to form an image when a voltage is passed across the composition.

21. The device of claim 14 wherein the matrix component (d) comprises a polymer or other viscosity modifier and the matrix is blended with the other components of the composition.

22. The device of claim 14 wherein the opacifier is selected from the group consisting of titanium dioxide, latexes, and barium titanate.

23. A composition comprising:
   (a) a compound that undergoes a electron transfer reaction with subsequent change in its protic state
   (b) at least one indicator dye which changes color when a change in pH occurs, and
   (c) an ionically conductive material and optionally component (d), a matrix material, wherein components (a), (b), (c) and (d) are different from one another and component (a) preferentially undergoes the electron transfer reaction when a charge is applied to the composition and provided that if (c) is a fluid the composition further comprises the matrix material (d).

24. The composition of claim 23 characterized in that component (a) is present in an amount from 0.01 to 15 weight percent, component (b) is present in an amount from 0.01 to 15 weight percent, component (c) is present in an amount from 5 to 99.98 weight percent, component (d) is present in an amount from 0 to 90 weight percent, an opacifier component (e) is present in an amount from 0 to 75 weight percent based on total weight of the composition and component (f) a secondary redox couple present in an amount of 0 to 15 weight percent.

25. The composition of claim 23 wherein component (a) is selected from the group consisting of iodates, bromates, sulfates, metal hydroxides, phosphates, ketones, aldehydes, quinones, quinolines, sulfur compounds, hydroxybenzenes, carboxylic acids, and amines.

26. The composition of claim 23 wherein component (b) comprises one or more indicator dyes selected from but not limited to the group consisting of phenylthalein, bromocrescol purple, phenol red, ethyl red, quinaldine red, thymolthalein, thymol blue, malachite green, crystal violet, methyl violet 2B, xylenol blue, cresol red, phyloxine B, congo red, methyl orange, bromochlorophenol blue, alizarin red, chlorophenol red, 4-nitrophenol, nile blue A, aniline blue, indigo carmine, and bromothymol blue.

27. The composition of claim 23 wherein component (c) is a solid electrolyte.

28. The composition of claim 23 wherein the matrix (d) comprises a polymer or other viscosity modifier and the matrix is blended with the other components of the composition.

29. The composition of claim 23 wherein component (e) one opacifier is selected from the group consisting of titanium dioxide, latexes, and barium titanate.

30. The composition of claim 23 wherein the component (f) the secondary redox couple is selected from the group consisting of iodates, bromates, sulfates, metal hydroxides, phosphates, ketones, aldehydes, quinones, quinolines, sulfur compounds, hydroxybenzenes, carboxylic acids, polyoxometallates, and amines.

31. A composition comprising:
   (a) a compound that undergoes a reversible redox reaction to generate a pH gradient,
   (b) at least one indicator dye,
   (c) a charge transport material, and
   (d) optionally, a matrix material wherein components (a), (b), (c) and (d) are different from one another, the standard reduction potential of component (a) is less than the standard reduction potential for the other components and provided that if (c) is a fluid the composition further comprises the matrix material (d).

32. The composition of claim 31 characterized in that component (a) is present in an amount from 0.01 to 15 weight percent, component (b) is present in an amount from 0.01 to 15 weight percent, component (c) is present in an amount from 5 to 99.98 weight percent, component (d) is present in an amount from 0 to 90 weight percent, an opacifier component (e) is present in an amount from 0 to 75 weight percent based on total weight of the composition and component (f) a secondary redox couple present in an amount of 0 to 15 weight percent.

33. The composition of claim 31 wherein component (a) is selected from the group consisting of iodates, bromates, sulfates, metal hydroxides, phosphates, ketones, aldehydes, quinones, quinolines, sulfur compounds, hydroxybenzenes, carboxylic acids, and amines.

34. The composition of claim 31 wherein component (b) comprises one or more indicator dyes selected from but not limited to the group consisting of phenylthalein, bromocrescol purple, phenol red, ethyl red, quinaldine red, thymolthalein, thymol blue, malachite green, crystal violet, methyl violet 2B, xylenol blue, cresol red, phyloxine B, congo red, methyl orange, bromochlorophenol blue, alizarin red, chlorophenol red, 4-nitrophenol, nile blue A, aniline blue, indigo carmine, and bromothymol blue.

35. The composition of claim 31 wherein component (c) is a solid electrolyte.

36. The composition of claim 31 wherein the matrix (d) comprises a polymer or other viscosity modifier and the matrix is blended with the other components of the composition.

37. The composition of claim 31 wherein component (e), the opacifier is selected from the group consisting of titanium dioxide, latexes, and barium titanate.

38. The composition of claim 31 wherein component (f) the secondary redox couple is selected from the group consisting of iodates, bromates, sulfates, metal hydroxides, phosphates, ketones, aldehydes, quinones, quinolines, sulfur compounds, hydroxybenzenes, carboxylic acids, polyoxometallates, and amines.

39. An article comprising a film further comprising the composition of claim 23 located on a substrate.

40. The article of claim 39 comprising a second substrate on the side of the film opposite the first substrate wherein at least one of the substrates is a release layer.

41. The article of claim 40 wherein the film thickness is from 25–100 um.

42. An article comprising a film further comprising the composition of claim 31 located on a substrate.

43. The article of claim 42 comprising a second substrate on the side of the film opposite the first substrate wherein at least one of the substrates is a release layer.

44. The article of claim 42 wherein the film thickness is from 25–100 um.

* * * * *

UNITED STATES PATENT AND TRADEMARK OFFICE
CERTIFICATE OF CORRECTION

PATENT NO. : 6,879,424 B2 Page 1 of 1
APPLICATION NO. : 10/102236
DATED : April 12, 2005
INVENTOR(S) : Vincent et al.

It is certified that error appears in the above-identified patent and that said Letters Patent is hereby corrected as shown below:

| Col. | Line | Error | Should Read |
|---|---|---|---|
| 1 | 38 | phenylthalein | phenolphthalein |
| 2 | 19 | (voltage) | ( and voltage ) |
| 6 | 28 | CV cyclability curves | CV curves |
| 6 | 59 | complimentary | complementary |
| 7 | 27 | phenylthalein, bromocresol | phenolphthalein, bromocresol |
| 7 | 28 | thymolthalein | thymolphthalein |
| 7 | 32 | nile blue | Nile blue |
| 8 | 47 | a protie solvent | a solvent |
| 8 | 48 | suitable protie solvent | a solvent |
| 8 | 57 | and water | and/or water |
| 9 | 51 | theological | rhelogical |
| 14 | 40 | bases | based |
| 14 | 40-41 | 3 hours significantly longer than the cell containing isopropyl alcohol. In | 3 hours. In |
| 15 | 2 | wire for reference | wire was used for the reference |

Signed and Sealed this

Thirtieth Day of January, 2007

JON W. DUDAS
*Director of the United States Patent and Trademark Office*